(12) United States Patent
Linietsky et al.

(10) Patent No.: US 10,394,539 B2
(45) Date of Patent: Aug. 27, 2019

(54) DYNAMICALLY CONFIGURED GRAPHICAL USER INTERFACE FOR A SOFTWARE APPLICATION

(75) Inventors: Laurence B. Linietsky, Montclair, NJ (US); Brian David Lakamp, Malibu, CA (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 1255 days.

(21) Appl. No.: 13/050,490

(22) Filed: Mar. 17, 2011

(65) Prior Publication Data

US 2012/0240065 A1 Sep. 20, 2012

(51) Int. Cl.
  *G06F 3/00* (2006.01)
  *G06F 8/61* (2018.01)
  *G06F 9/445* (2018.01)

(52) U.S. Cl.
  CPC ............ *G06F 8/61* (2013.01); *G06F 9/44505* (2013.01)

(58) Field of Classification Search
  CPC .................................................... G06F 8/61
  USPC .......................................................... 715/744
  See application file for complete search history.

(56) References Cited

U.S. PATENT DOCUMENTS

| | | | |
|---|---|---|---|
| 6,910,187 B2 | 6/2005 | Felkey et al. | |
| 2002/0103817 A1* | 8/2002 | Novak et al. | 707/205 |
| 2003/0197727 A1* | 10/2003 | Milius | 345/744 |
| 2008/0134045 A1 | 6/2008 | Fridman et al. | |
| 2009/0307105 A1* | 12/2009 | Lemay et al. | 705/26 |

* cited by examiner

*Primary Examiner* — Andrey Belousov
(74) *Attorney, Agent, or Firm* — Garlick & Markison; Edward J. Marshall

(57) ABSTRACT

A Graphical User Interface (GUI) Customization System provides users with applications that feature customized GUI configurations by applying one or more configuration parameters to common codebases in the applications without user intervention. Various embodiments of the GUI Customization System can provide different methods of acquiring, customizing, and providing applications and sets of configuration parameters to users.

6 Claims, 8 Drawing Sheets

DYNAMICALLY CONFIGURED GRAPHICAL USER INTERFACE FOR A SOFTWARE APPLICATION

FIELD

The present invention relates in general to Graphical User Interfaces (GUIs), and more particularly to configuring GUIs.

BACKGROUND

Many user devices, such as smart phones, media players, appliances, personal digital assistants (PDAs), wrist watches, computers, and television systems, can utilize software applications, commonly known as "applications" or "apps", to perform a variety of functions, including but not limited to playing media content and accessing specific media streams on the internet. Applications can often be downloaded onto a user device over the internet, such as from an online application store.

Apps each have a user interface that enables the user to control the functions of the app. One type of interface is known as a Graphical User Interface (GUI), which enables a user to interact with the functions of an app through graphical icons and other visual indicators.

In the media broadcast industry, which provides apps that can provide a user with access to media streams, a broadcast entity may desire to provide users with the ability to download apps that feature a GUI that is configured, or "customized", to utilize the familiarity of local brands or local personalities.

However, existing apps require affirmative actions by the user to customize the GUI of a downloaded app. For example, a user may download an app that features a generic GUI, but in order to customize the GUI, the user must take some affirmative action, including but not limited to contacting a remote server or website to download a GUI configuration or manually altering the elements of the existing GUI configuration.

SUMMARY

To overcome the limitations in the prior art described above, and to overcome other limitations that will become apparent upon reading and understanding the present specification, various embodiments of a method, apparatus, and computer-readable medium for providing users with downloadable applications with GUIs customized from a common codebase are disclosed.

In one aspect of the disclosure, a request to provide an application associated with a first market brand is received along with a GUI configuration parameter associated with the first market brand that is used to customize an unconfigured application obtained from a codebase to generate the application associated with the first market brand. The configured application can be transmitted to an end-user device, or, where customizing the unconfigured application includes generating the application associated with the first market brand using the end-user device, the unconfigured application and GUI configuration parameter can be transmitted to the end-user device. Customizing the unconfigured application can include, but is not limited to customizing default information sources, channel configurations, and advertising variables. In addition, a request to provide additional applications associated with additional market brands can be received along with additional GUI configuration parameters associated with the additional market brands that can be used to customize an unconfigured application obtained from the codebase to generate the additional applications associated with the additional market brands.

In another aspect of the disclosure, an apparatus features at least one codebase that includes unconfigured applications and processing circuitry that is configured to respond to a request to provide an application associated with a first market brand along with a provided GUI configuration parameter associated with the first market brand by using the provided GUI configuration parameter to customize an unconfigured application obtained from a codebase to generate the application associated with the first market brand. The processing circuitry can be configured to transmit the configured application to an end-user device, or, where customizing the unconfigured application includes generating the application associated with the first market brand using the end-user device, the processing circuitry can transmit both the unconfigured application and GUI configuration parameter to the end-user device. The processing circuitry can be configured to use the GUI configuration parameter to customize the unconfigured application by customizing various elements, including but not limited to default information sources, channel configurations, and advertising variables. In addition, the processing circuitry can be configured to receive a request to provide additional applications associated with additional market brands along with additional GUI configuration parameters associated with the additional market brands that can be used to customize an unconfigured application obtained from the codebase to generate the additional applications associated with the additional market brands.

Another aspect of the disclosure features a computer readable medium tangibly embodying a program of computer executable instructions to receive to a request to provide an application associated with a first market brand along with a provided GUI configuration parameter associated with the first market brand and use the provided GUI configuration parameter to customize an unconfigured application obtained from a codebase to generate the application associated with the first market brand. The program can also include instructions to transmit the configured application to an end-user device, or, where customizing the unconfigured application includes generating the application associated with the first market brand using the end-user device, the program can include instructions to transmit both the unconfigured application and GUI configuration parameter to the end-user device. The program can include instructions to use the GUI configuration parameter to customize the unconfigured application by customizing various elements, including but not limited to default information sources, channel configurations, and advertising variables. In addition, The program can include instructions to receive a request to provide additional applications associated with additional market brands along with additional GUI configuration parameters associated with the additional market brands that can be used to customize an unconfigured application obtained from the codebase to generate the additional applications associated with the additional market brands.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are described in such detail as to clearly communicate to one of ordinary skill how to make and use the claimed invention. However, the amount of detail offered is not intended to limit the anticipated variations of embodiments; on the contrary, the intention is to cover all modifications, equivalents, and alternatives falling within the spirit and scope of the present disclosure as defined by the appended claims.

One embodiment is comprised of a collection of components, which will be referred to herein as the app provider system. It is to be understood that these components may be combined in many different ways to form a variety of combinations within the scope of the disclosure.

The app provider system enables a system, such as an online application store, to utilize a single common codebase to provide applications with many different GUI configurations to users, all without either requiring additional user action beyond requesting download of an application featuring a specific GUI configuration or requiring the user to observe an application with a non-requested GUI configuration.

One advantageous feature of certain embodiments of the app provider system includes presenting users with multiple different applications, each featuring a different GUI configuration, while allowing the app provider system itself to store only a single configuration of the application, and the application store to only store the GUI configuration parameters used to customize the GUI configuration of an application to match a user's request.

Another advantageous feature of some embodiments of the app provider system includes rendering GUI customization a "seamless" and "transparent" process from the user's perspective. The application GUI can be customized prior to transmission of the application to the user. If the application is transmitted prior to customization, the application can be configured to automatically customize the GUI upon successful download or initialization, to ensure that the user only perceives the customized GUI configuration. Furthermore, the user is not required to be aware of the fact that each customized application is, in fact, a customized version of an unconfigured application: from the user's perspective, each customized application is the unconfigured version.

Figure 1:
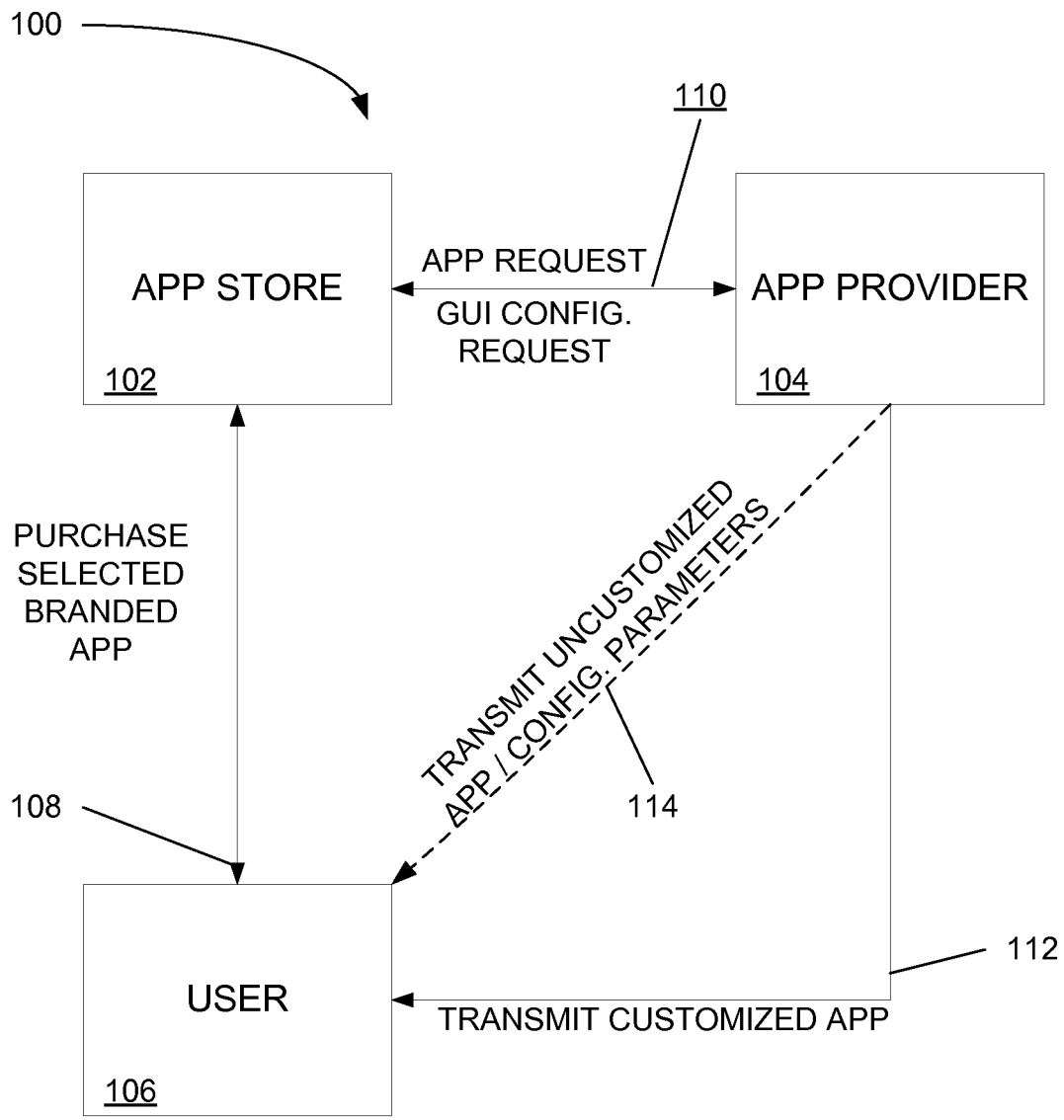
FIG. 1 depicts a schematic diagram illustrating an app store/app provider/user environment according to various embodiments of the present disclosure.

Referring first to FIG. 1, embodiments of the app provider system in relation to an app store and a user are illustrated and discussed. The overall system 100 includes, but is not limited to, an application store, or "app store" 102, an app provider system 104, and a user 106. The user 106 can be a user device or some other entity, including but not limited to an application store, an intermediate server, or a broadcast station. The app store 102 can be an online application store on the internet, a store on a cellular network, or a store on some other network. The app store 102 can be a part of a larger store that does not specialize in applications, or it can itself be specialized in selling another product or have no specialty at all. Alternatively, the app store can simply provide access to multiple applications, rather than sell them. The user 106 accesses the app store 102 and selects 108 an application for download. The app can be downloaded to the user, or it can be downloaded to another destination point. The app selected by the user can include a GUI configuration that is associated with a brand or market brand. A brand can include, but is not limited to, one or more of a radio personality, a brand of a radio station, and an indicator of a geographical market. Brands, in general, can include but are not limited to default information sources, channel configurations, advertising variables, reporting variables, logos, fonts, colors, splash pages, background images, graphical icons, other visual elements, and assignment of other module variables.

The app store 102 receives the purchase selection 108 and transmits a request 110 to the app provider system 104. The request 110 can include an identification of the application requested, as well as a GUI configuration parameter that is associated with the first market brand. The GUI configuration parameter can also serve as the identification of the application requested. In addition, the request 110 can include only an identification of the application requests, and the app provider system 104 can obtain the GUI configuration parameter from another source. The request 110 can also include, but is not limited to, a request to provide additional applications associated with other market brands, along with corresponding GUI configuration parameters associated with each market brand. The app provider obtains an unconfigured application from a codebase, and uses both the unconfigured application and the corresponding GUI configuration parameter to generate the user-selected customized application associated with a market brand. The app provider system 104 transmits 112 the customized application to the user 106; alternatively, if the user has specified a different destination point other than the user, the app provider system can transmit the customized application to the specified destination point. The app provider system 104 can also transmit the customized application back to the app store 102, and the app store 102 can then transmit the customized app to the user 106.

In addition to the above-described process, the app provider system can, rather than customize each application before transmittal 112 to the user, transmit 114 each non-customized application and the corresponding GUI configuration parameters to the user, provided that the customization process includes generating the application associated with the first market brand using the user 106 or end-user device. This customization process would occur upon the occurrence of an event which can include, but is not limited to, successful transmittal of both the unconfigured application and the GUI configuration parameter or first initialization of the application. The user is, in at least one embodiment, not required to take any action to apply the GUI configuration parameter to the application, although embodiments of the app provider system requiring some user action are possible and should be considered encompassed by this disclosure. As noted above, the transmission process 114 can also proceed from the app provider 104 to the user 106 via the app store 102.

Figure 2:
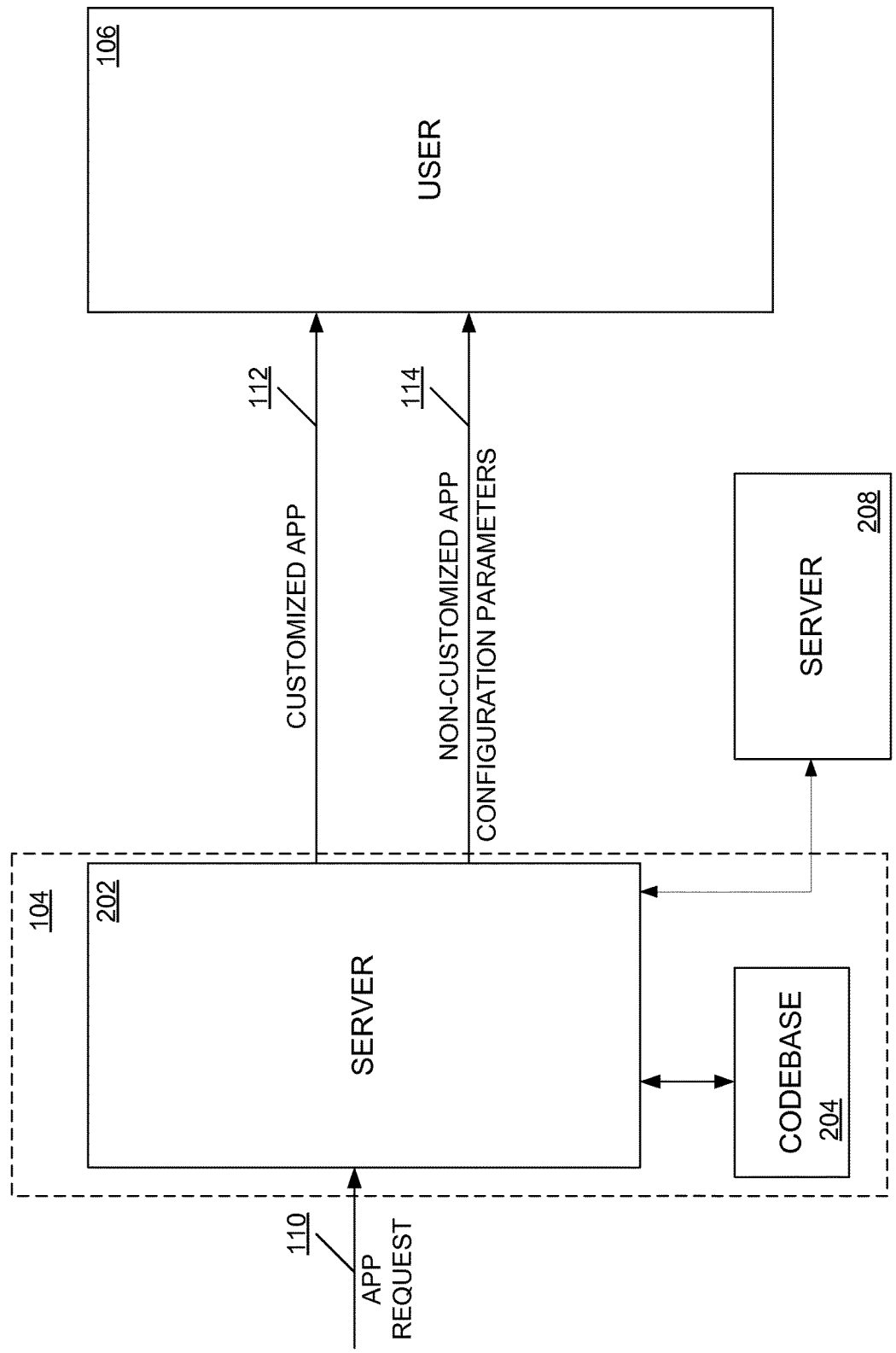
FIG. 2 depicts a schematic diagram illustrating an app provider/user environment according to various embodiments of the present disclosure.

Referring to FIG. 2, embodiments of the app provider system in relation to a user are illustrated and discussed. App provider system 104 includes, but is not limited to, a first server 202 that communicates with a user 106 and a codebase 204. The app provider system 104 can also include a second server 208, in place of or in combination with the codebase 204, although it should be understood that the second server 208 and codebase 204 can both be external to the app provider system 104. In addition, the codebase 104 can be internal to the first server 202. The user 106 can be a user device or some other entity, including but not limited to an application store, an intermediate server, or a broadcast station. The app provider system 104 receives a request 110 to provide the user with an application that is customized to be associated with a first market brand. The request 110 can include an identification of the application requested, as well as a GUI configuration parameter that is associated with the first market brand. The request 110 can also include, but is not limited to, a request to provide a second application associated with a second market brand, along with a second GUI configuration parameter associated with the second market brand.

The first server 202 can acquire each requested application, in an unconfigured state, from the codebase 204, which can itself be a part of the first server 202 or external to the first server 202. Alternatively, the first server can acquire each requested application, in an unconfigured state, from other sources, including but not limited to the second server 208. Acquisition of each requested application can include searching the codebase 204 for the application. Alternatively, application acquisition can include retransmitting or forwarding the request 110, in whole or in part, to the second server 208 which will acquire some or all of the requested unconfigured applications and transmit them to the first server 202.

Once the first server 202 has acquired each requested application, in an unconfigured state, and its corresponding GUI configuration parameter, the first server 202 can customize each application through the use of the corresponding GUI configuration parameter. The set of configuration parameters can be read by the common codebase of the unconfigured application as a set of instructions to configure the GUI. As a result, each unconfigured application is configured with a dynamically customized GUI. This application process can take place completely within the first server 202 and without user intervention. Once each application has been configured to feature the requested custom GUI, the customized application is transmitted 112 to the user. It should be understood that, where multiple applications are requested, the customized applications can be transmitted individually, in groups, or simultaneously.

In addition to the above-described process, the server can, rather than customize each application before transmittal 112 to the user, transmit 114 each non-customized application and the corresponding GUI configuration parameters to the user, provided that the customization process includes generating the application associated with the first market brand using the user 106 or end-user device. This customization process would occur upon the occurrence of an event which can include, but is not limited to, successful transmittal of both the unconfigured application and the GUI configuration parameter or first initialization of the application. The user is not required to take any action to apply the GUI configuration parameter to the application, although such embodiments of the app provider system are possible and should be considered encompassed by this disclosure.

From the user's perspective, the user may select an application associated with a market brand or other brand for download. The user will download an application, and upon first use of the application, the user will observe that the application is the requested application. The entire process of customizing the application is transparent to the user, and the user generally does not observe an unconfigured application, although such embodiments of the app provider system are possible and should be considered encompassed by this disclosure.

Figure 3:
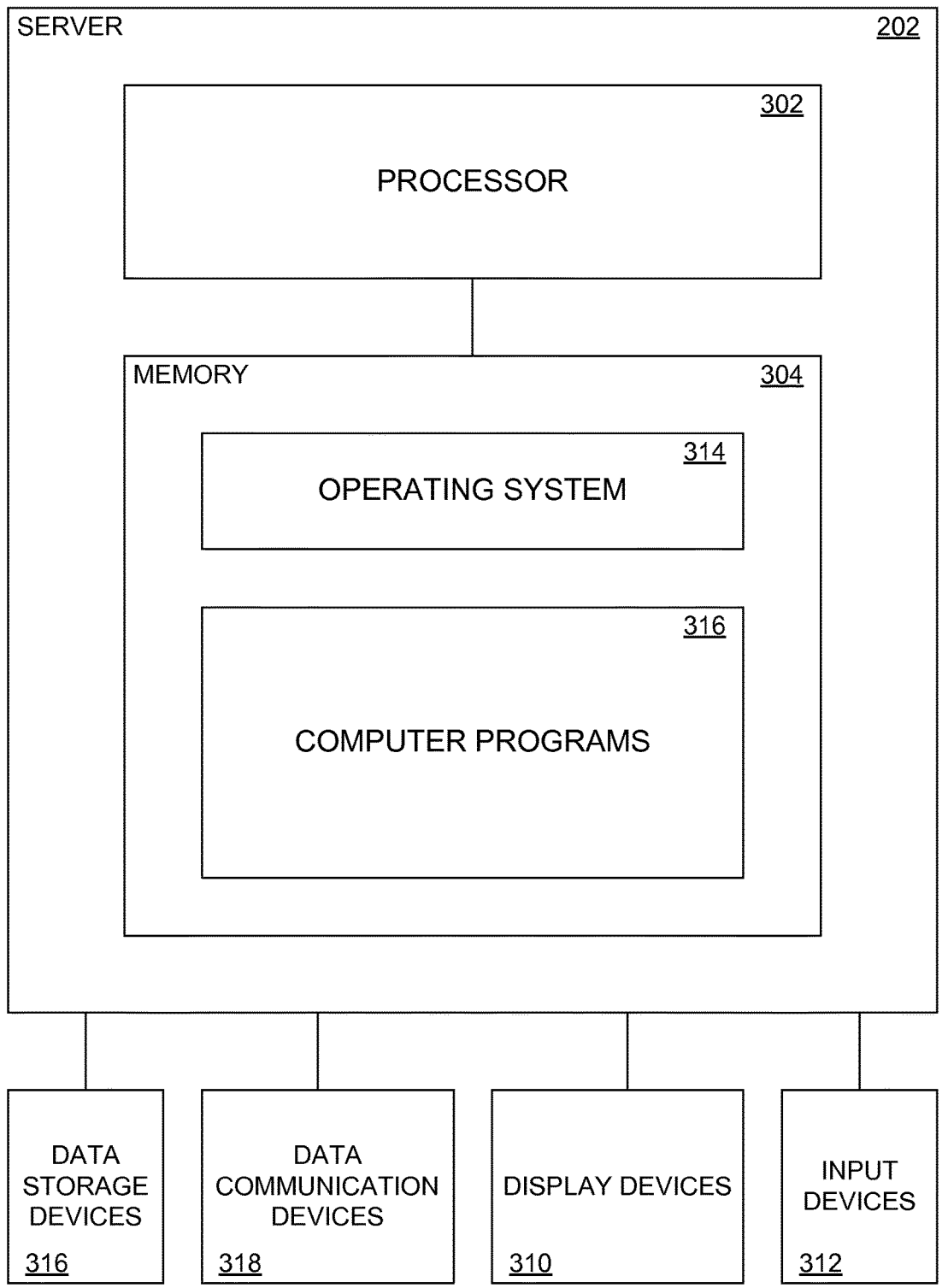
FIG. 3 depicts a schematic diagram illustrating a hardware environment used to implement a server according to various embodiments of the present disclosure.

FIG. 3 is a schematic diagram illustrating a hardware environment used to implement a server computer 202 in one embodiment of the invention. The present invention is typically implemented using a server computer 202, which generally includes a processor or processing circuitry 302, a random access memory (RAM) 304, data storage devices 306 (e.g., hard, floppy, and/or CD-ROM disk, drives, etc.) data communications devices 308 (e.g., modems, network interfaces, etc.), display devices 310 (e.g., CRT, LCD display, etc.), and input devices 312 (e.g., mouse pointing device, keyboard, CD-ROM drive, etc.). It is envisioned that attached to the server computer 202 may be other devices, such as read only memory (ROM), a video card, bus interface, printers, etc. Those skilled in the art will recognize that any combination of the above components, or any number of different components, peripherals, and other devices, may be used with the server computer 202.

The server computer 202 operates under the control of an operating system (OS) 314. The operating system 314 is booted into the memory 304 of the server computer 202 for execution when the server computer 202 is powered-on or reset. In turn, the operating system 314 then controls the execution of one or more computer programs 316, such as the comparison software for comparing the parameter requirements with available advertisements, and list software for creating a XML list of targeted advertisements. The present invention is generally implemented in these computer programs 316, which execute under the control of the operating system 314, and cause the server computer 202 to perform the desired functions as described herein.

The operating system 314 and computer programs 316 are comprised of instructions which, when read and executed by the server computer 202, cause the server computer 202 to perform the steps necessary to implement and/or use the present invention. Generally, the operating system 314 and/or computer programs 316 are tangibly embodied in and/or readable from a device, carrier, or media such as memory 304, data storage devices 306, and/or data communications devices 308. Under control of the operating system 314, the computer programs 316 may be loaded from the memory 304, data storage devices 306, and/or data communications devices 308 into the memory 304 of the server computer 202 for use during actual operations.

Thus, the present disclosure may be used to implement a method, apparatus, or article of manufacture using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Those skilled in the art will recognize many modifications may be made to this configuration without departing from the scope of the present invention.

Those skilled in the art will also recognize that the environment illustrated in FIG. 3 is not intended to limit the present invention. Indeed, those skilled in the art will recognize that other alternative hardware environments may be used without departing from the scope of the present invention.

Figure 4:
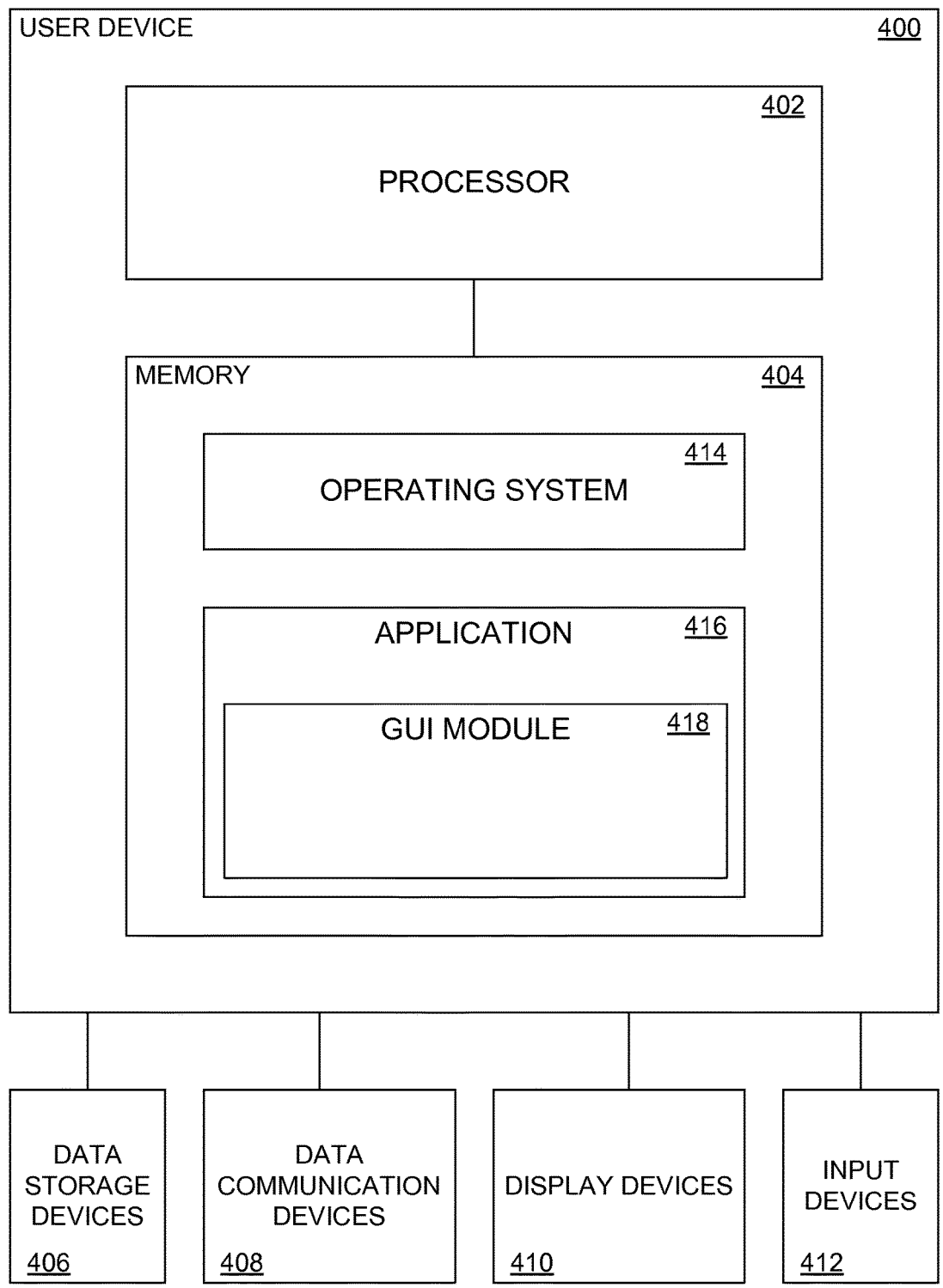
FIG. 4 depicts a schematic diagram illustrating a hardware environment used to implement a user device according to various embodiments of the present disclosure.

FIG. 4 is a schematic diagram illustrating a hardware environment used to implement a user device 400 used by a user 106 in one embodiment of the invention. The present invention is typically implemented using a user device 400, which generally includes a processor or processing circuitry 402, a random access memory (RAM) 404, data storage devices 406 (e.g., hard, floppy, and/or CD-ROM disk, drives, etc.), data communications devices 408 (e.g., modems, network interfaces, etc.), display devices 410 (e.g., CRT, LCD display, etc.), and input devices 412 (e.g., mouse pointing device, keyboard, CD-ROM drive, etc.). It is envisioned that attached to the user device 400 may be other devices, such as read only memory (ROM), a video card, bus interface, printers, etc. Those skilled in the art will recognize that any combination of the above components, or any number of different components, peripherals, and other devices, may be used with the user device 400.

The user device 400 operates under the control of an operating system (OS) 414. The operating system 414 is booted into the memory 404 of the user device 400 for execution when the user device 400 is powered-on or reset. In turn, the operating system 414 then controls the execution of one or more applications 416. An application 416 can include a GUI module 418, which controls the GUI of the application 416. The GUI module 418, is comprised of instructions which, when read and executed by the GUI module 418, cause the GUI module 418 to perform the steps necessary to configure the GUI of the application 416.

The operating system 414 and applications 416 are comprised of instructions which, when read and executed by the user device 400, cause the user device 400 to perform the steps necessary to implement and use applications. Generally, the operating system 414 and applications 416 are tangibly embodied in and/or readable from a device, carrier, or media such as memory 404, data storage devices 406, and/or data communications devices 408. Under control of the operating system 414, the applications 416 may be loaded from the memory 404, data storage devices 406, and/or data communication devices 408 into the memory 404 of the user device 400 for use during actual operations.

Thus, the present disclosure may be implemented as a method, apparatus or article of manufacture, using standard programming and/or engineering techniques to produce software, firmware, hardware, or any combination thereof. The term "article of manufacture" (or alternatively, "computer program product") as used herein, is intended to encompass an application accessible from any computer-readable device, carrier, or media. Of course, those skilled in the art will recognize many modifications may be made to this configuration without departing from the scope of the present invention.

Those skilled in the art will also recognize that the environment illustrated in FIG. 4 is not intended to limit the present invention. Indeed, those skilled in the art will recognize that other alternative hardware environments may be used without departing from the scope of the present invention.

Figure 5:
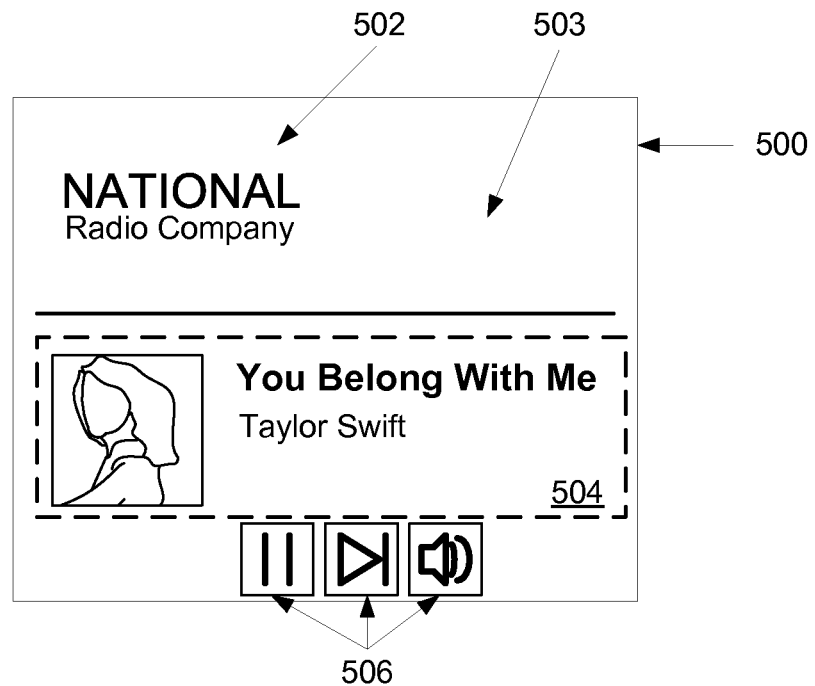
FIG. 5 depicts an illustration of a non-customized Graphical User Interface (GUI) of an application according to various embodiments of the present disclosure.

As shown in FIG. 5, an embodiment of an application GUI 500 is illustrated and discussed. The illustrated GUI 500 is for an application that provides a user with a media stream. This stream includes, but is not limited to, media content, such as songs, advertisements, and broadcast programs. The stream can also include, but is not limited to metadata, which can be displayed 504 by the GUI 500 in formats consistent with, or different from, the format of the GUI configuration. The GUI 500 includes visual elements, sometimes referred to herein as branding, or "market branding", 502, which can include, but is not limited to logos, fonts, and colors. The term branding 502 also includes the general appearance, or "skin" 503, of the GUI 500, which can include, but is not limited to the "splash page", background image, and various icons. Branding 502 can also encompass the menu configuration, such as placement or configuration of menu controls 506 and the manner in which information, including but not limited to metadata 504, is displayed. Additional branding elements that can be present in a GUI 500, and therefore subject to configuration and customization, include but are not limited to channel configurations, assignments of module variables (e.g., URLs for mobile web modules; sources for feeds, photos, on demand video, on demand audio; etc.), assignments of reporting variables (e.g., Omniture), and assignment of advertisement variables (e.g., DFP).

Figure 6:
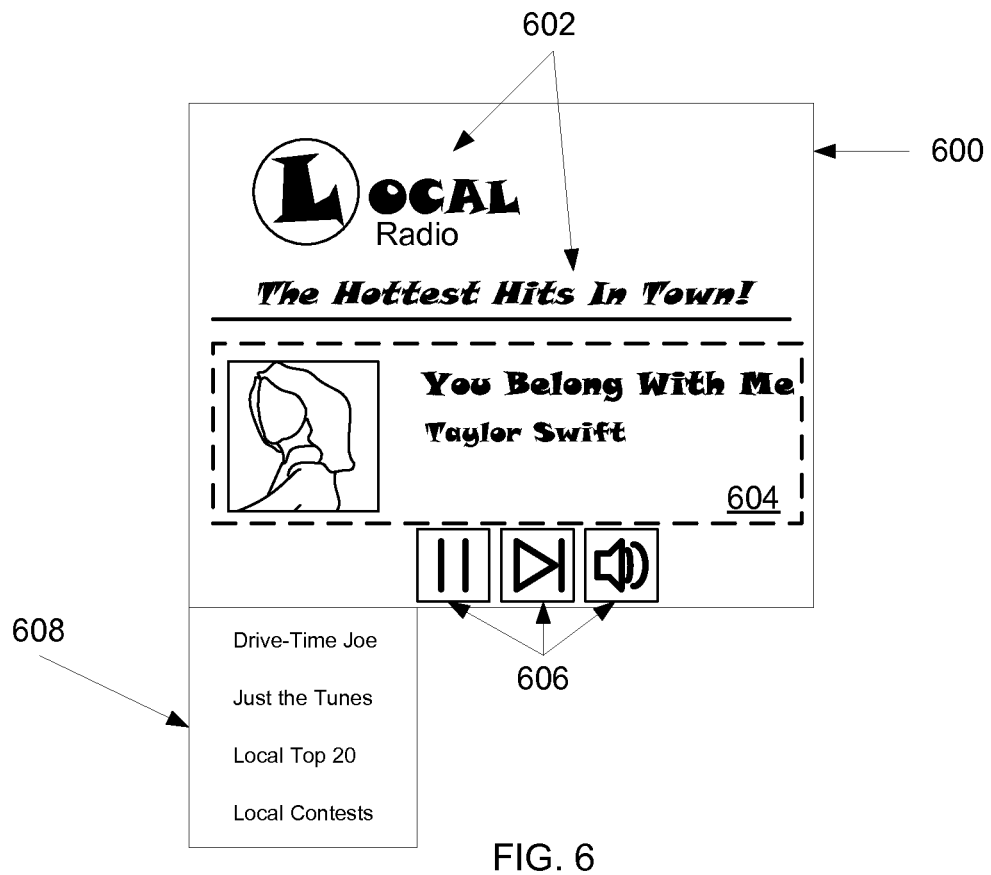
FIG. 6 depicts an illustration of a customized Graphical User Interface (GUI) of an application according to various embodiments of the present disclosure.

Referring now to FIG. 6, the app provider system enables a user to request an application that features a customized GUI 600 configuration. Such a customized GUI configuration can utilize visual elements that are more relevant or desirable to a user. For example, enabling a user to request an application with local branding elements 602, as opposed to uniform branding elements of a national or global entity, can augment the user's experience. In addition, for an application that provides user access to a media stream, the information 604 provided by the stream, as well as user menu controls 606, can be presented to the user through the use of the visual elements of the customized GUI configuration, including but not limited to fonts, colors, and graphical icons. Also, the custom GUI 600 can include access to special local-specific programs 608, including but not limited to daypart-specific programs, playlists, and contests.

Figure 7:
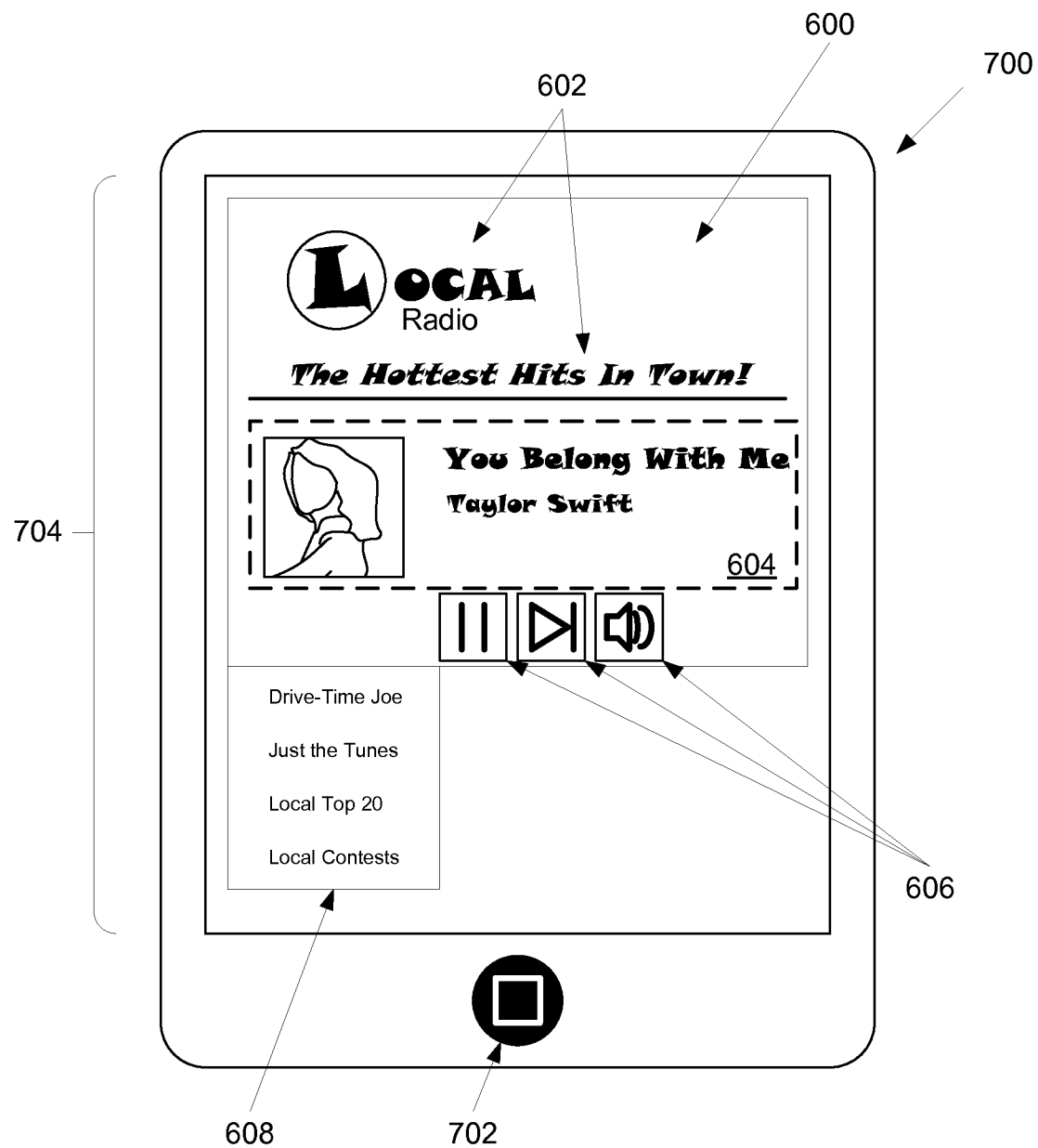
FIG. 7 depicts an illustration of a customized Graphical User Interface (GUI) of an application displayed on a user device according to various embodiments of the present disclosure.

As shown in FIG. 7, the customized GUI 600 enables a user to access and utilize the customized application on a user device 700. User devices 700 include, but are not limited to smart phones, media players, appliances, personal digital assistants (PDAs), wrist watches, computers, and television systems. They can provide a visual display system 704, through which a user can observe the GUI 600. The user may access and manipulate the functions of the application, through the GUI, by using device controls 702 on the device, including but not limited to buttons or device-specific icons; if the functionality of the device permits, such as through the use of a touchscreen or mouse, the user can interact directly with menu controls 606 displayed on the GUI 600.

Figure 8:
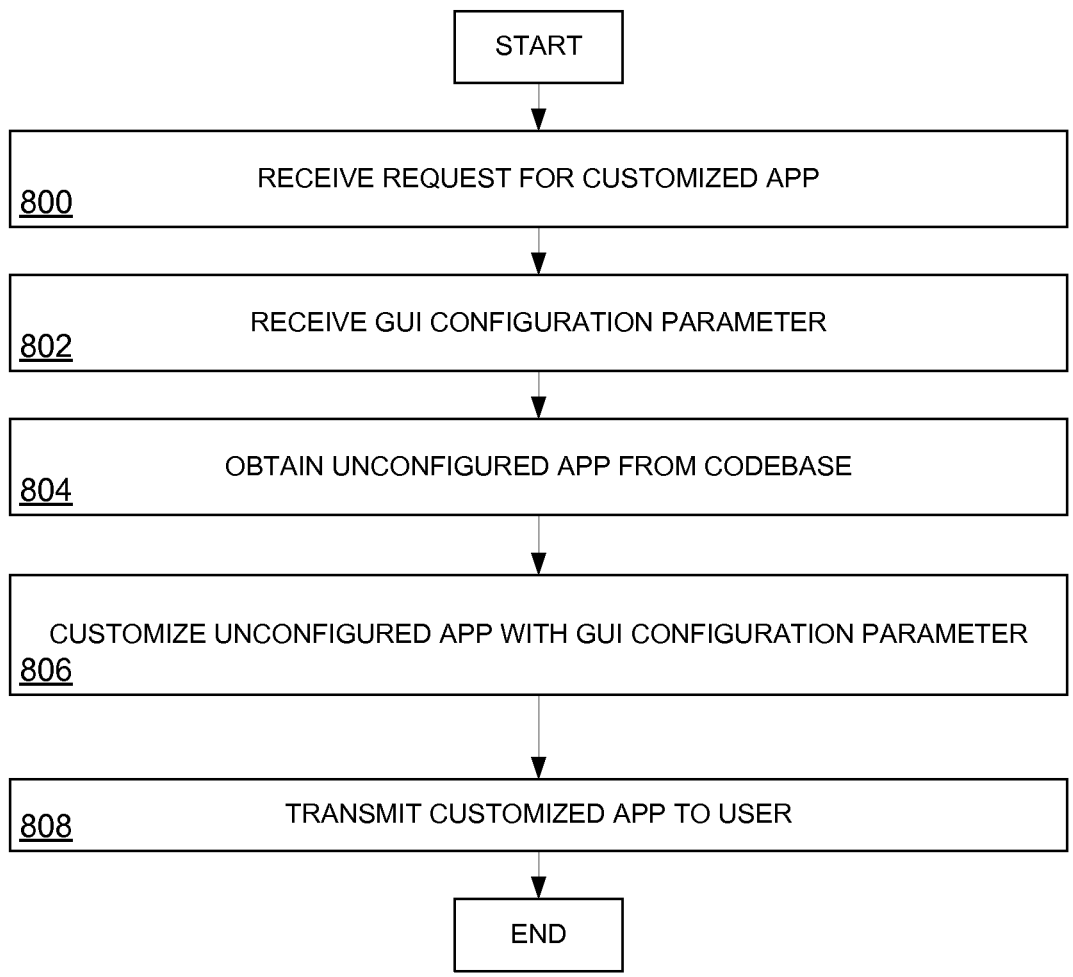
FIG. 8 depicts a flowchart illustrating a method for customizing the GUI of an application according to various embodiments of the present disclosure.

FIG. 8 is a flow diagram illustrating one embodiment of the process performed by the app provider system. The app provider system receives a request from an app store for an application that is "customized" to be associated with a first market brand, as shown in block 800. As shown in block

802, the app provider system also receives a GUI configuration parameter that is associated with the first market brand. The GUI configuration parameter can be received in conjunction with the request to provide the customized app, but it can also be received separately. As shown in block 804, the app provider system accesses a common codebase to obtain an unconfigured application. As shown in block 806, the app provider system uses the GUI configuration parameter to customize the unconfigured application to be associated with a first market brand. The process of customizing the unconfigured application can include, but is not limited to customizing default information sources, channel configurations, advertising variables, and reporting variables. In addition, the process of customization can include, but is not limited to, customizing logos, fonts, colors, splash pages, background images, graphical icons, and assignment of other module variables. As shown in block 808, the app provider system can transmit the customized application to the user.

Alternatively, if the customization process includes generating the application associated with the first market brand using the end-user device, the app provider system can transmit both the unconfigured application and the GUI configuration parameter to an end-user device. Either the unconfigured application or the GUI configuration parameter can be configured to initiate the customization process at some event, including but not limited to the successful transmission of the GUI configuration parameter and the application or the initialization of the application. This process would, like the process shown in FIG. 8, be transparent to the user and need not require any affirmative action by the user. It should also be understood that the app provider system can perform the process illustrated in FIG. 8 for multiple applications and configuration parameters simultaneously or at later, predetermined time intervals.

In addition, it should be understood that the app provider system can transmit either the customized application or the combination of unconfigured application and GUI configuration parameter to another target, including but not limited to an intermediate network or access point, a website, or a server.

It should also be understood that the app provider system can, after transmitting the application to the user, as shown in block 808, receive both a request to provide a second application associated with a second market brand and a second GUI configuration parameter associated with the second market brand. The app provider system can then customize the unconfigured application using the second GUI configuration parameter, to generate the second application associated with the second market brand. This process can also occur simultaneously with the above-discussed process for the application associated with the first market brand.

The functioning of the app provider system and the app store can also be tracked. For example, the downloads, ratings, and rankings of specific customized applications can be tracked, individually or in collective groups under encompassing entities (e.g., downloads of various locally branded applications are tracked under the umbrella of the national brand). In addition, the app provider system or app store can track downloads from an individual brand, such as a specific broadcast station or personality. Also, the use of a specific GUI configuration parameter could be tracked. The use of a common codebase means that all downloaded applications could be updated through the use of a single new common codebase, rather than provide a separate new codebase for each configuration. Finally, the use of configuration parameters to customize applications would enable a parent entity to upload, en masse, GUI configuration parameters for its local brands without being required to prefabricate applications for each local brand or personality.

Figure 9:
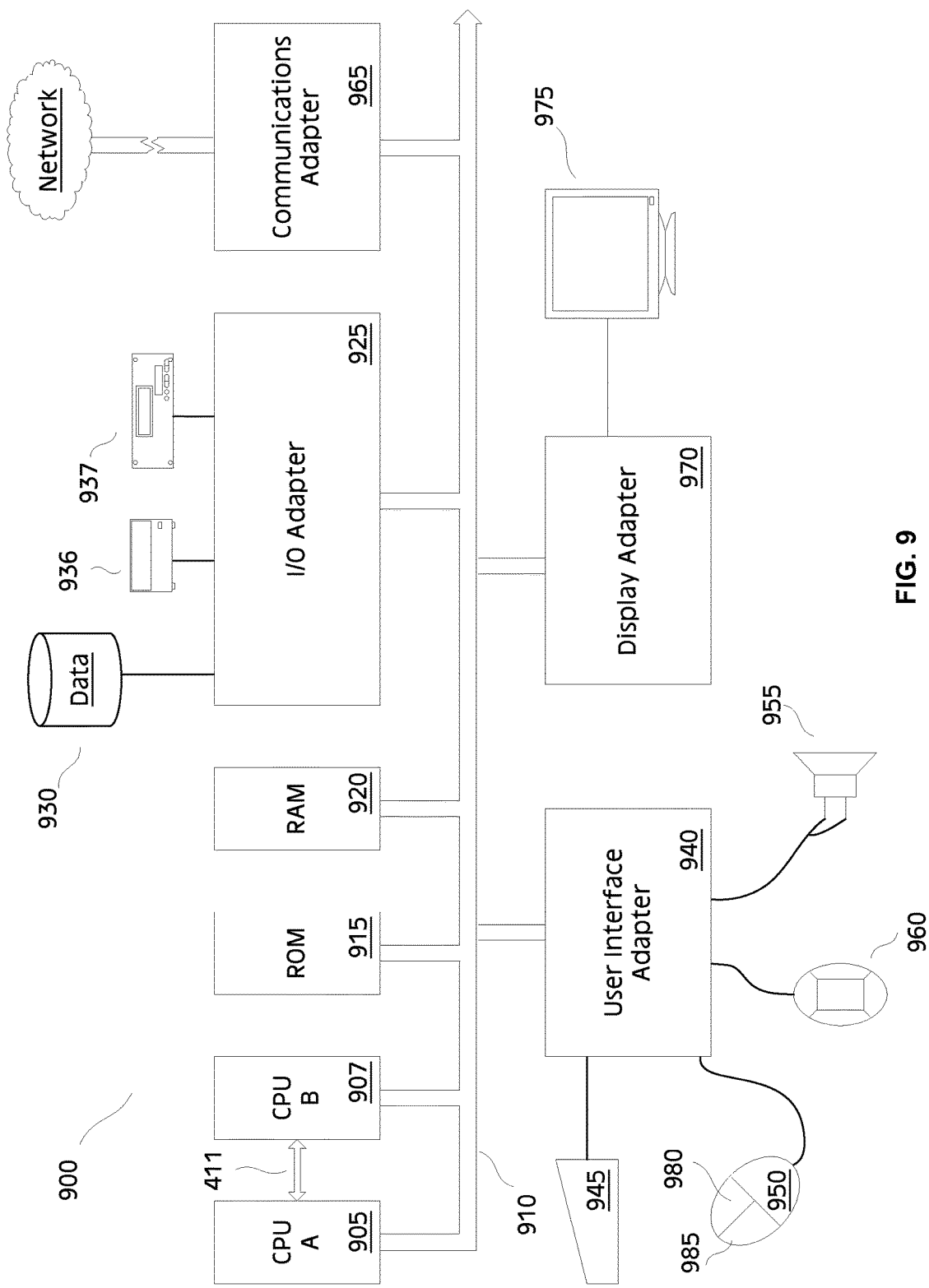
FIG. 9 depicts a high-level block diagram of a processing system according to various embodiments of the present disclosure.

Referring now to FIG. 9, a high-level block diagram of a processing system is illustrated and discussed. Processing system 900 includes one or more central processing units, such as CPU A 905 and CPU B 907, which may be conventional microprocessors interconnected with various other units via at least one system bus 910. CPU A 905 and CPU B 907 may be separate cores of an individual, multi-core processor, or individual processors connected via a specialized bus 911. In some embodiments, CPU A 905 or CPU B 907 may be a specialized processor, such as a graphics processor, other co-processor, or the like.

Processing system 900 includes random access memory (RAM) 920; read-only memory (ROM) 915, wherein the ROM 915 could also be erasable programmable read-only memory (EPROM) or electrically erasable programmable read-only memory (EEPROM); and input/output (I/O) adapter 925, for connecting peripheral devices such as disk units 930, optical drive 936, or tape drive 937 to system bus 910; a user interface adapter 940 for connecting keyboard 945, mouse 950, speaker 955, microphone 960, or other user interface devices to system bus 910; communications adapter 965 for connecting processing system 900 to an information network such as the Internet or any of various local area networks, wide area networks, telephone networks, or the like; and display adapter 970 for connecting system bus 910 to a display device such as monitor 975. Mouse 950 has a series of buttons 980, 985 and may be used to control a cursor shown on monitor 975.

It will be understood that processing system 900 may include other suitable data processing systems without departing from the scope of the present disclosure. For example, processing system 900 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any tangible medium that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It will be understood that the app provider system 104 may include other components, elements, or interfaces without departing from the scope of the present disclosure. Furthermore, although particular embodiments have been discussed above, the invention is not limited to the disclosed embodiments, but includes subject matter encompassed by the scope of the appended claims.

What is claimed is:

1. A computer readable medium tangibly embodying a program of computer executable instructions by an end-user device, the program of computer executable instructions comprising:
   at least one instruction to receive, by an application provider system from an online application store, an application request associated with a user request to provide an application having a graphical user interface (GUI), the application request identifying at least the application and a first local branding element of a plurality of different local branding elements;
   at least one instruction to receive by the application provider system from the online application store, a graphic user interface (GUI) configuration parameter associated the first local branding element, the GUI configuration parameter indicating at least one GUI visual element associated with the first local branding element including at least one of an associated logo, font or color;
   at least one instruction to download from a codebase, responsive to the application request, an unconfigured application having a GUI with a non-customized configuration; and
   at least one instruction to alter the unconfigured application to generate a customized application from the unconfigured application and the GUI configuration parameter, the customized application having a configured GUI associated with the first local branding element;
   at least one instruction to download, responsive to the user request, the GUI configuration parameter from a source other than the online application store.

2. The computer readable medium of claim 1, the program of computer executable instructions further comprising at least one instruction to:
   transmitting the customized application to the end-user device.

3. The computer readable medium of claim 1, wherein the at least one instruction to generate the customized application comprises:
   at least one instruction to customize default information sources; and
   at least one instruction to customize channel configurations.

4. The computer readable medium of claim 1, wherein the at least one instruction to generate the customized application comprises:
   at least one instruction to customize advertising variables.

5. The computer readable medium of claim 1, wherein the at least one instruction to generate the customized application comprises:
   customizing reporting variables.

6. The computer readable medium of claim 1, the program of computer executable instructions further comprising:
   at least one instruction to alter the unconfigured application to generate a second customized application from the same unconfigured application, but using different GUI configuration parameters.

* * * * *